US007018700B2

(12) United States Patent
Park

(10) Patent No.: US 7,018,700 B2

(45) Date of Patent: Mar. 28, 2006

(54) ACOUSTIC ABSORPTION POLYMER FOAM HAVING IMPROVED THERMAL INSULATING PERFORMANCE

(75) Inventor: Chung P. Park, Waltham, MA (US)

(73) Assignee: Dow Global Technologies Inc., Midland, MI (US)

( * ) Notice: Subject to any disclaimer, the term of this patent is extended or adjusted under 35 U.S.C. 154(b) by 269 days.

(21) Appl. No.: 10/204,718

(22) PCT Filed: Feb. 13, 2001

(86) PCT No.: PCT/US01/04589

§ 371 (c)(1),
(2), (4) Date: Aug. 22, 2002

(87) PCT Pub. No.: WO01/70479

PCT Pub. Date: Sep. 27, 2001

(65) Prior Publication Data

US 2004/0039072 A1 Feb. 26, 2004

(51) Int. Cl.
*B29B 1/48* (2006.01)
*B32B 3/10* (2006.01)

(52) U.S. Cl. ...................... 428/131; 264/154; 264/155; 264/156

(58) Field of Classification Search ................ 264/154, 264/155, 156; 428/159, 131
See application file for complete search history.

(56) References Cited

U.S. PATENT DOCUMENTS 3,239,585 A 3/1966 Karpovich et al. ........... 264/84
3,386,877 A 6/1968 Skochdopole et al. ...... 161/160
4,154,785 A 5/1979 Inui et al. .................. 264/45.5
4,211,590 A * 7/1980 Steward et al. ............... 156/79
4,229,396 A 10/1980 Suh et al. ..................... 264/53
4,423,101 A 12/1983 Willstead ..................... 428/76
4,435,346 A 3/1984 Ito et al. ....................... 264/54
4,548,775 A 10/1985 Hayashi et al. ............ 264/45.5
4,714,716 A 12/1987 Park ........................... 521/80
4,715,473 A * 12/1987 Tschudin-Mahrer ......... 181/286
4,741,945 A * 5/1988 Brant et al. ................. 428/158
4,916,198 A 4/1990 Scheve et al. .............. 526/351
4,938,912 A * 7/1990 Pelzer ........................ 264/504
5,116,881 A 5/1992 Park et al. .................. 521/143
5,132,171 A * 7/1992 Yoshizawa et al. ...... 428/317.1
5,206,082 A 4/1993 Malone ...................... 428/294
5,232,643 A * 8/1993 Purser ....................... 264/46.6
5,242,634 A 9/1993 Matsumoto .................. 264/25
5,348,795 A 9/1994 Park .......................... 428/220
5,424,016 A 6/1995 Kolosowski ................ 264/156
5,527,573 A 6/1996 Park et al. ............... 428/314.8
5,567,742 A 10/1996 Park .......................... 521/143
5,585,058 A 12/1996 Kolosowski ................ 264/156
5,605,936 A 2/1997 DeNicola, Jr. et al. .... 521/50.5
5,618,853 A 4/1997 Vonken et al. ................ 521/60
5,643,969 A 7/1997 Sakamoto et al. ............ 521/81
5,776,390 A 7/1998 Fiddelaers et al. ............ 264/50
5,801,208 A 9/1998 Lee ............................ 521/98
5,817,705 A 10/1998 Wilkes et al. ................. 521/79
5,843,058 A 12/1998 Quist ......................... 604/369
5,929,127 A 7/1999 Raetzsch et al. .............. 521/81
5,929,129 A 7/1999 Feichtinger ................. 521/134
5,962,545 A * 10/1999 Chaudhary et al. ......... 521/146
6,007,890 A 12/1999 DeBlander ................... 428/72
6,030,696 A 2/2000 Lee ........................... 428/220
6,207,254 B1 3/2001 Lee et al. ................... 428/159
6,225,366 B1 5/2001 Raetsch et al. ............. 521/134
6,251,319 B1 6/2001 Tusim et al. ............... 264/45.9
6,284,842 B1 9/2001 Ho et al. .................... 525/194
6,541,105 B1 * 4/2003 Park ........................ 428/304.4
6,590,006 B1 * 7/2003 Park et al. .................. 521/134

FOREIGN PATENT DOCUMENTS

DE 3514817 10/1985

(Continued)

OTHER PUBLICATIONS

Dow Deutschland Product Information sheet for GREY-FOAM polyethylene foam plank published Apr. 1998.

*Primary Examiner*—Allan R. Kuhns

(57) ABSTRACT

Polymer foams having a good balance of high sound absorption, low thermal conductivity and generally low water absorption are disclosed which are obtainable by perforating (i.e., hole punching) a polymer foam having a moderately large cell size (1.5 mm to 4 mm) and an open content not greater than 40 percent to increase the open cell content of the foam by at least about 10 percent relative to the non-perforated foam, the polymer foam matrix preferably made of a thermoplastic foam, such as a low-density polyethylene (LDPE) resin, a high melt strength (HMS) polypropylene resin (PP), or a blend of an HMS PP resin and an LDPE resin, optionally containing a cell size enlarging agent such as glycerol monostearate, an antioxidant, carbon black and/or flame retardant additives, using a volatile organic compound, e.g. isobutane, as blowing agent. These foams are useful for applications in which a combination of acoustic absorption, thermal insulation and possibly low water absorption is needed, such as outdoor, motor vehicle and marine applications. They exhibit a noise reduction coefficient greater than 0.3, a thermal conductivity not greater than 90 mW/m° K measured at an average temperature of 10° C. according to DIM52616 and a low (less than 10, such as less than 1.5, percent by volume) water absorption when measured according to EN 12088 at a 50° C. temperature gradient for an exposure test period of 14 days.

18 Claims, No Drawings

FOREIGN PATENT DOCUMENTS

| | | |
|---|---|---|
| EP | 190889 | 4/1993 |
| EP | 674578 | 9/1999 |
| JP | 59-30871 | 2/1984 |
| JP | 62-273826 | 11/1987 |
| JP | 0-2188233 | 7/1990 |
| WO | WO 84/00901 | 3/1984 |
| WO | WO 90/14159 | 11/1990 |
| WO | WO 94/13460 | 6/1994 |
| WO | WO 00/12594 | 3/2000 |
| WO | WO 00/15700 | 3/2000 |

* cited by examiner

ACOUSTIC ABSORPTION POLYMER FOAM HAVING IMPROVED THERMAL INSULATING PERFORMANCE

BACKGROUND OF THE INVENTION

This invention relates to extruded cellular thermoplastic polymer foam useful for both sound absorption and thermal insulation end uses.

Polymer foams having desirable sound absorption properties are well known. Many are also known that are made of thermoplastic materials. However, one of the drawbacks in using thermoplastic polyolefin foams is that they generally not suitable for both acoustic absorption and thermal insulation. Acoustic absorption is generally considered to require the use of open celled foams or a combination thereof a macrocellular foam, while thermal insulation is generally considered to require closed cell foams or microcellular foams. The open celled foams are considered to be at a further disadvantage in environments exposed to water, because they tend to absorb water, lowering their thermal insulating value even more.

Therefore, there is still a need for improved thermoplastic polymer foam materials capable of such dual use, especially for wet environments.

SUMMARY OF THE INVENTION

One aspect of the present invention is a method for making cellular acoustic absorption polymer foam having improved thermal insulating performance comprising:

(A) Providing a polymer foam having an average cell size in the range from 1.5 mm to 4 mm and an open cell content not greater than 40 percent, preferably no greater than 30 percent, and more preferably no greater than 20 percent, measured according to ASTM D2856, Procedure A, and (B) Perforating the polymer foam provided in step (A) at a surface of the polymer foam to form a multiplicity of perforation channels extending from that surface into the polymer foam such that the open cell content of the foam measured according to ASTM D2856, Procedure A, is increased relative to the step (A) polymer foam by at least 10 percent to obtain a perforated polymer foam having an open cell content of at least 20 percent, measured according to ASTM D2856, Procedure A.

Other aspects of this invention are the cellular polymer foams obtainable according to the above method and their use as acoustic insulation. Included are cellular polymer foams useful for acoustic and thermal insulation comprising a polymer foam having an average cell size in the range from about 1.5 mm to about 4 mm and an open cell content not greater than about 50 percent measured according to ASTM D2856, Procedure A, which has a multiplicity of perforation channels extending from that surface into the polymer foam according to the following formulae:

$$PD \geqq X/(ACS)^2$$

$$Z \times \%OCC/(100-\%OCC)) \leqq (PD)$$

wherein "PD" represents the number of perforation channels per square centimeter formed by step (B); "ACS" represents the average cell size of the polymer foam provided in step (A) measured in millimeters according to ASTM D3576; "%OCC" represents the percent open cell content of the perforated polymer foam measured according to ASTM D2856, Procedure A; "X" is a positive integer equal to 4; and "Z" is a positive number equal to 1. The polymer is preferably:

(A) at least one predominantly isotactic, polypropylene polymer having (1) a tan δ value not greater than 1.5, (2) a melt tension of at least 7 centiNewtons (cN), and/or (3) a melt strength of at least 10 centiNewtons (cN) and, optionally, (B) at least one ethylene polymer resin produced via a free radical process blended with the polypropylene polymer preferably in a weight ratio of not greater than about 65:35.

The polymer foam preferably has a density less than 25 kg/m$^3$.

DETAILED DESCRIPTION OF THE INVENTION

1. Components for Making the Foam

Thermoplastic resins suitable for the polymer foams of the present invention include all types of thermoplastic polymers, and blends thereof, that are foamable by extrusion processes. Examples of thermoplastic polymer resins suitable for the present invention include, but are not limited to, polystyrenes and polyolefin resins, including polyethylene resins, polypropylene resins, as well as blends of ethylene-styrene interpolymer (ESI) resins with polyolefin resins, such as blends of polyethylene and ESI or polypropylene and ESI, with polyethylene resins, copolymers of polyethylene resins, and blends of polyethylene resins being preferred. Examples of such resins are low density polyethylene resins, such as those having a melt index of 0.9 dg/minute and a density of 0.922 g/cm$^3$.

The aforementioned ethylene-styrene interpolymer is a substantially random interpolymer comprising in polymerized form i) one or more α-olefin monomers and ii) one or more vinyl or vinylidene aromatic monomers or a combination thereof one or more sterically hindered aliphatic or cycloaliphatic vinyl or vinylidene monomers, and optionally iii) other polymerizable ethylenically unsaturated monomer (s).

The term "interpolymer" is used herein to indicate a polymer wherein at least two different monomers are polymerized to make the interpolymer.

The term "substantially random" is the substantially random interpolymer resulting from polymerizing i) one or more α-olefin monomers and ii) one or more vinyl or vinylidene aromatic monomers or a combination thereof one or more sterically hindered aliphatic or cycloaliphatic vinyl or vinylidene monomers, and optionally iii) other polymerizable ethylenically unsaturated monomer(s) as used herein generally means that the distribution of the monomers of said interpolymer can be described by the Bernoulli statistical model or by a first or second order Markovian statistical model, as described by J. C. Randall in POLYMER SEQUENCE DETERMINATION, Carbon-13 NMR Method, Academic Press New York, 1977, pp. 71–78. Preferably, the substantially random interpolymer resulting from polymerizing one or more α-olefin monomers and one or more vinyl or vinylidene aromatic monomers, and optionally other polymerizable ethylenically unsaturated monomer (s), does not contain more than 15 percent of the total amount of vinyl or vinylidene aromatic monomer in blocks of vinyl or vinylidene aromatic monomer of more than 3 units. More preferably, the interpolymer is not characterized by a high degree of either isotacticity or syndiotacticity. This means that in the carbon-13 NMR spectrum of the substantially random interpolymer the peak areas corresponding to the main chain methylene and methine carbons representing either meso diad sequences or racemic diad sequences should not exceed 75 percent of the total peak area of the main chain methylene and methine carbons. By the subsequently used term "substantially random interpolymer" is meant a substantially random interpolymer produced from the above-mentioned monomers.

Suitable α-olefin monomers which are useful for preparing the substantially random interpolymer include, for example, α-olefin monomers containing from 2 to 20, preferably from 2 to 12, more preferably from 2 to 8 carbon atoms. Particularly suitable are ethylene, propylene, butene-1, 4-methyl-1-pentene, hexene-1 or octene-1 or ethylene in combination with one or more of propylene, butene-1, 4-methyl-1-pentene, hexene-1 or octene-1. Most preferred are ethylene or a combination of ethylene with $C_{3-8}$-α-olefins. These α-olefins do not contain an aromatic moiety.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

Suitable vinyl or vinylidene aromatic monomers which can be employed to prepare the substantially random interpolymer include, for example, those represented by the following Formula I (Formula I)

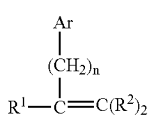

wherein $R^1$ is selected from radicals consisting of hydrogen and alkyl radicals containing from 1 to 4 carbon atoms, preferably hydrogen or methyl; each $R^2$ is independently selected from the group of radicals consisting of hydrogen and alkyl radicals containing from 1 to 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to 4, preferably from zero to 2, most preferably zero. Particularly suitable such monomers include styrene and lower alkyl- or halogen-substituted derivatives thereof. Preferred monomers include styrene, α-methyl styrene, the lower alkyl-($C_1$–$C_4$) or phenyl-ring substituted derivatives of styrene, such as for example, ortho-, meta-, and para-methylstyrene, t-butyl styrene, the ring halogenated styrenes, such as chlorostyrene, para-vinyl toluene or mixtures thereof. A more preferred aromatic monovinyl monomer is styrene.

The most preferred substantially random interpolymers are interpolymers of ethylene and styrene and interpolymers of ethylene, styrene and at least one α-olefin containing from 3 to 8 carbon atoms.

The substantially random interpolymers usually contain from 0.5 to 65, preferably from 1 to 55, more preferably from 2 to 50 mole percent of at least one vinyl or vinylidene aromatic monomer or a combination thereof sterically hindered aliphatic or cycloaliphatic vinyl or vinylidene monomer and from 35 to 99.5, preferably from 45 to 99, more preferably from 50 to 98 mole percent of at least one aliphatic α-olefin having from 2 to 20 carbon atoms. These interpolymers can be prepared according to WO98/10014 incorporated herein by reference.

The polymer foam provided according to step (A) preferably comprises at least one polyolefin. In one embodiment, the polymer foam provided according to step (A) is a cellular thermoplastic polymer foam having an average cell size of at least 1.5 millimeter (mm), a density not greater than 300 kilograms per cubic meter (kg/$m^3$), an average sound absorption coefficient of at least 0.2, and a beat distortion temperature of at least 110 degrees Celsius (° C.), wherein the thermoplastic polymer comprises:

(A) at least one predominantly isotactic, propylene polymer having a tan δ value not greater than 1.5 and optionally (B) at least one ethylene polymer produced via a free radical process blended with the polypropylene polymer (A), wherein the thermoplastic polymer comprises ethylene polymer (B) blended with the propylene polymer (A) in a weight ratio of not greater than 65:35;

the foam has at least one surface, the at least one surface having defined therein a multiplicity of perforation channels extending from the at least one surface into the foam such that there is an average of at least one perforation channel per 10 square centimeters ($cm^2$) area of the at least one surface or a combination thereof the foam has a density less than 25 kg/$m^3$.

The term "propylene polymer" as used herein means a polymer in which at least 50 weight percent of its monomeric units are derived directly from propylene. Suitable ethylenically unsaturated monomers other than propylene that may be included in the propylene polymer, include olefins, vinylacetate, methylacrylate, ethylacrylate, methyl methacrylate, acrylic acid, itaconic acid, maleic acid, and maleic anhydride. Appropriate propylene interpolymers include random, block, and grafted copolymers or interpolymers of propylene and an olefin selected from the group consisting of ethylene, $C_4$–$C_{10}$ 1-olefins, and $C_4$–$C_{10}$ dienes. Propylene interpolymers also include random terpolymers of propylene and 1-olefins selected from the group consisting of ethylene and $C_4$–$C_8$ 1-olefins. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, and 3-methyl-1-hexene. Examples of $C_4$–$C_{10}$ dienes include 1,3-butadiene, 1,4-pentadiene, isoprene, 1,5-hexadiene, and 2,3-dimethyl-1,3-hexadiene. As used herein, the term "interpolymers" means polymers derived from the reaction of two of more different monomers and includes, for example, copolymers and terpolymers.

The propylene polymer material may be comprised solely of one or more propylene homopolymers, one or more propylene copolymers, and blends of one or more of each of propylene homopolymers and copolymers. The polypropylene preferably comprises at least 70, even more preferably at least 90, and even more preferably 100, weight percent propylene monomer derived units (that is, the propylene homopolymers are preferred).

The propylene polymer preferably has a weight average molecular weight ($M_w$) of at least 100,000. $M_w$can be measured by known procedures.

The propylene polymer also preferably has a branching index less than 1. The branching index is an approach to quantifying the degree of long chain branching selected for this particular invention. The definition of branching index and procedure for determining the same is described in column 3, line 65 to column 4, line 30, of U.S. Pat. No. 4,916,198, which is incorporated herein by reference. The branching index is more preferably less than 0.9, and even more preferably less than 0.4.

The propylene polymer has a tan δ value not greater than 1.5, preferably not greater than 1.2, even more preferably not greater than 1.0, and even more preferably not greater than 0.8. Tan δ may be calculated from g"/g', where g" is the loss modulus of the propylene polymer and g' is storage modulus of the propylene polymer melt using a 2.5 mm thick and 25 mm diameter specimen of the propylene polymer at 190 C at a one Radian per second oscillating frequency. These parameters may be measured using a mechanical spectrometer, such as a Rheometrics Model RMS-800 available from Rheometrics, Inc., Piscataway, N.J., U.S.A. Further details of how to carry out this determination of the tan δ, g' and g" values is provided in column 5, lines 59 to 64, and column 6, lines 4 to 29, of U.S. Pat. No. 5,527,573, which is incorporated herein by reference.

In addition or in the alternative, the propylene polymer preferably has a melt tension of at least 7 centiNewtons (cN), more preferably at least 10 cN, and even more preferably at least 15 cN, and even more preferably at least 20 cN. Preferably, the propylene polymer has a melt tension not greater than 60 cN, more preferably not greater than 40 cN. The term "melt tension" as used throughout this description refers to a measurement of the tension in cN of a strand of molten polymer material at extruded from a capillary die with an diameter of 2.1 mm and a length of 40 mm at 230° C. at an extrusion rate of 20 mm/minute (min.) and a constant take-up speed of 3.14 meter/minute using an apparatus known as a Melt Tension Tester Model 2 available from Toyo Seiki Seisaku-sho, Ltd. This method for determining melt tension is sometimes referred to as the "Chisso method".

In addition or in the alternative, the propylene polymer preferably has a melt strength of at least 10 centiNewtons (cN), more preferably at least 20 cN, and even more preferably at least 25 cN, and even more preferably at least 30 cN. Preferably, the propylene polymer has a melt strength not greater than 60 cN, more preferably not greater than 55 cN. The term "melt strength" throughout this description refers to a measurement of the tension in cN of a strand of molten polymer material extruded from a capillary die with an diameter of 2.1 mm and a length of 41.9 mm at 190° C. at a rate of 0.030 cc/sec. and stretched at a constant acceleration to determine the limiting draw force, or strength at break, using an apparatus known as a Gottfert Rheotens™ melt tension apparatus available from Gottfert, Inc.

The propylene polymer used in the process of the invention preferably also has a melt elongation of at least 100 percent, more preferably at least 150 percent, most preferably at least 200 percent as measured by the same Rheotens™ melt tension apparatus and general procedure described above.

The propylene polymer material preferably also has a melt flow rate of at least 0.01 more preferably at least 0.05, even more preferably at least 0.1 g/10 min., and even more preferably at least 0.5 g/10 min. up to 100, more preferably up to 50, even more preferably up to 20, and even more preferably up to 10, g/10 min. Throughout this description, the term "melt flow rate" refers to a measurement conducted according to American Society for Testing and Materials (ASTM) D-1238 condition 230° C./2.16 kg. (aka Condition L).

Preferred propylene polymers include those that are branched or lightly cross-linked. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. U.S. Pat. Nos. 3,250,731 and 4,714,716 and published International Application WO 99/10424 illustrate this method and are incorporated herein by reference. Irradiation techniques are illustrated by U.S. Pat. Nos. 5,605,936 and 5,883,151, which are also incorporated by reference. The polymer composition used to prepare the foam preferably has a gel content of less than 10 percent, more preferably less than 5 percent, per ASTM D2765-84, Method A.

The expression "ethylene polymer produced" as used herein means a polymer in which at least 50 weight percent of its monomeric units are derived directly from ethylene. In one embodiment, the ethylene polymer is preferably an ethylene polymer produced via a free radical process. The ethylene polymer is preferably produced without the presence of a catalyst, particularly a solid catalyst or another catalyst capable of acting as a nucleating agent for the foamable composition used to make the foams of the present invention. The ethylene polymers are preferably low density polyethylene (LDPE), vinyl esters of monocarboxylic acids such as vinyl acetate and vinyl propionate and esters of monoethylenic carboxylic acids such as methyl (meth)acrylate, ethyl (meth)acrylate, propyl (meth)acrylate, and mixtures thereof Suitable ethylene interpolymers include those described as "soft ethylenic polymers" in U.S. Pat. No. 4,101,467, the disclosure of which is incorporated herein by reference. Specific examples of preferred ethylene polymers include LDPE, ethylene-vinyl acetate copolymer (EVA), ethylene-ethyl acrylate copolymer (EEA), or a combination thereof ethylene-acrylic acid copolymer (EAA), and mixtures thereof. The amount of monomer other than ethylene incorporated into the ethylene polymer is less than 50 weight-percent (wt %), more preferably not greater than 30 wt %, even more preferably not greater than 10 wt %, and even more preferably not greater than 1 wt %. The ethylene polymers are preferably low density polyethylene (LDPE).

The above-mentioned ethylene polymers are readily available as commercial products or a combination thereof the processes for making them are well known. The Dow Chemical Company, for example, is a well known manufacturer of some of the above-identified ethylene polymers.

The ethylene polymer has a melt index, $I_2$, preferably in the range from at least 0.01, more preferably 0.05 and even more preferably at least 0.1, g/10 min. up to 100, more preferably up to 50, and even more preferably up to 20, g/10 min. Throughout this description, the term "melt index" refers to a measurement conducted according to ASTM D-1238, condition 190° C./2.16 kg.

Blowing agents useful in making the present foam include all types of blowing agents known in the art; physical and chemical blowing agents and mixtures thereof, including inorganic blowing agents, organic blowing agents, and chemical blowing agents. Suitable inorganic blowing agents include carbon dioxide, nitrogen, argon, water, air, and helium. Organic blowing agents include aliphatic hydrocarbons having 1–6 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, and neopentane. Aliphatic alcohols include methanol, ethanol, n-propanol, and isopropanol. Fully and partially halogenated aliphatic hydrocarbons include chlorocarbons, fluorocarbons, and chlorofluorocarbons. Chlorocarbons for use in this invention include methyl chloride, methylene chloride, ethyl chloride, and 1,1,1-trichloroethane. Fluorocarbons for use in this invention include methyl fluoride, methylene fluoride, ethyl fluoride, 1,1-difluoroethane (HFC-152a), 1,1,1-trifluoroethane (HGC-143a), 1,1,1,2-tetrafluoroethane (HFC-134a), 1,1,2,2-tetrafluoroethane (HFC-134), pentafluoroethane, perfluoroethane, 2,2-difluoropropane, 1,1,1-trifluoropropane, and 1,1,1,3,3-pentafluoropropane. Partially hydrogenated chlorofluorocarbons for use in this invention include chlorodifluoromethane (HCFC-22), 1,1-dichloro-1-fluoroethane (HCFC-141b), 1-chloro-1,1-difluoroethane (HCFC-142b), 1,1-dichloro- 2,2,2-trifluoroethane (HCFC-123), and 1-chloro-1,2,2,2-tetrafluoroethane (HCFC-124). Fully halogenated chlorofluorocarbons may also be used but are not preferred for environmental reasons. Chemical blowing agents for use in this invention include azodicarbonamide, azodiisobutyro-nitrile, benzenesulfonylhydrazide, 4,4-oxybenzene sulfonyl-semicarbazide, p-toluene sulfonyl semicarbazide, N,N=-dimethyl-N,N=-dinitrosoterephthalamide, and trihydrazine triazine, sodium bicarbonate, mixtures of sodium bicarbonate and citric acid. Mixtures of all these blowing agents are also contemplated within the scope of this invention. Preferred blowing agents for the extrusion process and batch process for making moldable beads are physical blowing agents, with volatile organic blowing agents being preferred, with low hydrocarbons (for example, propane, butane and isobutane) being most preferred. Preferred blowing agents for cross-linked foam processes are decomposable blowing agents and nitrogen.

The amount of blowing agent incorporated into the polymer melt material to make a foam-forming gel is varied as required to achieve a predetermined density.

The foams of the present invention optionally further comprise an infrared absorber (transmission blocker) such as carbon black, graphite, or titanium dioxide, to enhance thermal insulating capability. When utilized, the infrared absorber may comprise between 1.0 and 25 weight percent and preferably between 2.0 and 10.0 weight percent, based upon the weight of the polymer blend in the foam. The carbon black may be of any type known in the art such as furnace black, thermal black, acetylene black, and channel black.

It is preferred that the foams of the present invention exhibit dimensional stability. A stability control agent may be especially desirable in producing thick (that is, greater than 4 mm) sheet and plank products (thicker than 12 mm) of substantially closed-cell structure from the foregoing foams. In contrast, an additional stability control agent is probably not necessary or desirable when forming substantially open-celled foams.

Dimensional stability is measured by taking the foam volume during aging as a percentage of the initial volume of the foam, measured within 30 seconds after foam expansion. Using this definition, a foam which recovers 80 percent or more of the initial volume within a month is tolerable, whereas a foam which recovers 85 percent or more is preferred, and a foam which recovers 90 percent or more is especially preferred. Volume is measured by a suitable method such as cubic displacement of water.

Preferred stability control agents include amides and esters of $C_{10-24}$ fatty acids. Such agents are taught in U.S. Pat. Nos. 3,644,230 and 4,214,054. Most preferred agents include stearyl stearamide, glycerol monostearate, glycerol monobenenate, and sorbitol monostearate. Typically, such stability control agents are employed in an amount ranging from 0.1 to 10 parts per hundred parts of the polymer.

Various additives may also be incorporated in the foams such as inorganic fillers, pigments, antioxidants, acid scavengers, ultraviolet absorbers, flame retardants, processing aids, or extrusion aids. Optionally, a nucleating agent may be added to the foamable blend. The amount of nucleating agent employed to prepare the foams of the present invention will vary according to the desired cell size, the foaming temperature, and the composition of the nucleating agent. For example, when a large foam size is desired, little or no nucleating agent should be used. Useful nucleating agents include calcium carbonate, barium stearate, calcium stearate, talc, clay, titanium dioxide, silica, barium stearate, diatomaceous earth, mixtures of citric acid and sodium bicarbonate. When utilized, the amount of nucleating agent employed may range from 0.01 to 5 parts by weight per hundred parts by weight of the polymer resin blend (pph).

2. Processes for Making the Foam

The polymer foams of the present invention may be prepared by techniques and procedures well known to one of ordinary skill in the art and include extrusion processes as well as batch processes using a decomposable blowing agent and cross-linking, with extrusion processes being preferred.

In an extrusion foaming process, the polymer constituents are converted into a polymer melt and incorporates a blowing agent and, if desired, other additives into the polymer melt to form a foamable gel. One then extrudes the foamable gel through a die and into a zone of reduced or lower pressure that promotes foaming to form a desired product. The reduced pressure is lower than that under which the foamable gel is maintained prior to extrusion through the die.

Before extruding foamable gel through the die, the foamable gel is cooled from a temperature that promotes melt mixing to a lower temperature which is generally within 30° centigrade (° C.) the melt temperature ($T_m$) of the constituent polymers of the foamable composition.

The blowing agent may be incorporated or mixed into the polymer melt by any means known in the art such as with an extruder, mixer, or blender. The blowing agent is mixed with the polymer melt at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting.

Any conventional blowing agent may be used to make foams according to the present invention. U.S. Pat. No. 5,348,795 discloses a number of suitable blowing agents at column 3, lines 15–61, the teachings of which are incorporated herein by reference. U.S. Pat. No. 5,527,573 also discloses a number of suitable blowing agents at column 4, line 66 through column 5, line 20, the teachings of which are incorporated herein by reference. Preferred blowing agents include aliphatic hydrocarbons having 1–9 carbon atoms, especially propane, n-butane and isobutane.

In an extrusion process, the cell-size is affected by several parameters that include the type and level of blowing agent, the polymer type, the geometry of the die orifice, the shear rate at the die, the level of nucleating agent, the use of a cell enlarging agent, and the foaming temperature. In order to make the cell size large, the cell nucleating agent is normally not added. Instead, a cell enlarging agent may be added. Among the rest of the parameters, the type and level of blowing agent have the greatest effect on the cell size. Ordinarily, blowing agents having a relatively high solubility and a small molecular size at a relatively low level provide a large cell size. Examples of such blowing agents include propane, n-butane, isobutane, n-pentane, methyl chloride, methylene chloride, ethyl chloride, methanol, ethanol, dimethyl ether, water, and a mixed blowing agent containing one or more of these blowing agents. Branched ethylenic polymer resins prepared by the high-pressure free-radical method tend to provide large cells when expanded with these blowing agents. The cell size enlarging additives are, in general those compounds that are used in plasticizing polymer resins. Examples of cell size enlargers include waxy materials having a relatively low melting point as are described in U.S. Pat. No. 4,229,396, and non-waxy low molecular weight compounds as are disclosed in U.S. Pat. No. 5,489,407. In addition, a relatively low shear rate at the die orifice results in a large cell size.

The polymer foams of the present invention may be cross-linked or non-cross-linked. Processes for making polymer foam structures and processing them are taught in C. P. Park, *Polyolefin Foam*, Chapter 9, Handbook of Polymer Foams and Technology, edited by D. Klempner and K. C. Frisch, Hanser Publishers, Munich, Vienna, N.Y. Barcelona (1991).

Non-crosslinked foams of the present invention may be made by a conventional extrusion foaming process. The foam structure is generally prepared by heating a thermoplastic polymer resin (that is, polymer material) to form a plasticized or melt polymer material, incorporating therein a blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art, such as with an extruder, mixer, blender, or the like. The blowing agent is mixed with the melt polymer material at an elevated pressure sufficient to prevent substantial expansion of the melt polymer material and to disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (vacuum), but is preferably at an atmospheric level.

Non-crosslinked foams of the present invention may be formed in a coalesced strand form by extrusion of the thermoplastic polymer resin (that is, polymer material) through a multi-orifice die. The orifices are arranged so that contact between adjacent streams of the molten extrudate occurs during the foaming process and the contacting surfaces adhere to one another with sufficient adhesion to result in a unitary foam structure. The streams of molten extrudate exiting the die take the form of strands or profiles, which desirably foam, coalesce, and adhere to one another to form a unitary structure. Desirably, the coalesced individual strands or profiles should remain adhered in a unitary structure to prevent strand delamination under stresses encountered in preparing, shaping, and using the foam. Apparatuses and method for producing foam structures in coalesced strand form are taught in U.S. Pat. Nos. 3,573,152 and 4,824,720.

The present foam structure may also be formed into non-crosslinked foam beads suitable for molding into articles. The foam beads may be prepared by an extrusion process or a batch process. In the extrusion process, the foam strands coming out of a multi-hole die attached to a conventional foam extrusion apparatus are granulated to form foam beads. In a batch process, discrete resin particles such as granulated resin pellets are: suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is taught in U.S. Pat. Nos. 4,379,859 and 4,464,484.

Cross-linked foams of the present invention may be prepared by either the cross-linked foam process employing a decomposable blowing agent or by conventional extrusion processes.

When utilizing the cross-linked foam process employing a decomposable blowing agent, cross-linked foams of the present invention may be prepared by blending and heating the thermoplastic polymer resin (that is, polymer material) with a decomposable chemical blowing agent to form a foamable plasticized or melt polymer material, extruding the foamable melt polymer material through a die, inducing cross-linking in the melt polymer material and exposing the melt polymer material to an elevated temperature to release the blowing agent to form the foam structure. The polymer material and the chemical blowing agent may be mixed and the melt blended by any means known in the art such as with an extruder, mixer, blender, or the like. The chemical blowing agent is preferably dry-blended with the polymer material prior to heating the polymer material to a melt form, but may also be added when the polymer material is in melt phase. Cross-linking may be induced by addition of a cross-linking agent or by radiation. Induction of cross-linking and exposure to an elevated temperature to effect foaming or expansion may occur simultaneously or sequentially. If a cross-linking agent is used, it is incorporated into the polymer material in the same manner as the chemical blowing agent. Further, if a cross-linking agent is used, the foamable melt polymer material is heated or exposed to a temperature of preferably less than 150° C. to prevent decomposition of the cross-linking agent or the blowing agent and to prevent premature cross-linking. If radiation cross-linking is used, the foamable melt polymer material is heated or exposed to a temperature of preferably less than 160° C. to prevent decomposition of the blowing agent. The foamable melt polymer is extruded or conveyed through a die of desired shape to form a foamable structure. The foamable structure is then cross-linked and expanded at an elevated or high temperature (typically, 150° C. to 250° C.) such as in an oven to form a foam structure. When radiation cross-linking is used, the foamable structure is irradiated to cross-link the polymer material, which is then expanded at the elevated temperature as described above. The structure can advantageously be made in sheet or thin plank form according to the above process using either cross-linking agents or radiation.

In addition to use of a cross-linking agent or radiation in the cross-linked foam process employing a decomposable blowing agent, cross-linking may also be accomplished by means of silane cross-linking as described in C. P. Park, Supra, Chapter 9.

Cross-linked foams of the present invention may also be made into a continuous plank structure by an extrusion process utilizing a long-land die as described in GB 2,145, 961A. In that process, the polymer, decomposable blowing agent, and cross-linking agent are mixed in an extruder; the mixture is heated to permit the polymer to cross-link and the blowing agent to decompose in a long-land die; and foam structure is shaped and conducted away from the die, with the foam structure and the die contact being lubricated by a proper lubrication material.

Cross-linked foams of the present invention may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. In another version of the process, the polymer beads are impregnated with blowing agent, cooled down, discharged from the vessel, and then expanded by heating or with steam. In a derivative of the above process, styrene monomer may be impregnated into the suspended pellets along with the cross-linking agent to form a graft interpolymer with the polymer material. Blowing agent may be impregnated into the resin pellets while in suspension, or alternatively, in a non-hydrous state. The expandable beads are then expanded by heating with steam and molded by a conventional molding method for the expandable polystyrene foam beads.

The foam beads may then be molded by any means known in the art, such as charging the foam beads to the mold, compressing the mold to compress the beads, and heating the beads such as with steam to effect coalescing and welding of the beads to form the article. Optionally, the beads may be pre-heated with air or other blowing agent prior to charging to the mold. Excellent teachings of the above processes and molding methods are found in C. P. Park, Supra, pp. 227–233, U.S. Pat. Nos. 3,886,100; 3,959, 189; 4,168,353, and 4,429,059. The foam beads can also be prepared by preparing a mixture of polymer, cross-linking agent, and decomposable mixtures in a suitable mixing device or extruder and forming the mixture into pellets, and heating the pellets to cross-link and expand.

Another process for making cross-linked foam beads suitable for molding into articles to melt the polymer material and mix it with a physical blowing agent in a conventional foam extrusion apparatus to form an essentially continuous foam strand. The foam strand is granulated or pelletized to form foam beads. The foam beads are then cross-linked by radiation. The cross-linked foam beads may then be coalesced and molded to form various articles as described above for the other foam bead process. Additional teachings of this process are found in U.S. Pat. No. 3,616, 365 and C. P. Park, Supra, pp. 224–228.

In addition, silane cross-linking technology may be employed in the extrusion process. Teachings of this process are found in C. P. Park, Supra, Chapter 9 and in U.S. Pat. No. 4,714,716. When silane cross-linking processes are utilized with conventional extrusion processes, a polymer is grafted with a vinyl functional silane or an azido functional silane and extruded to form foams. The extruded foams are then exposed to warm humid air for the cross-linking to develop.

The cross-linked foams of the present invention may be made in bun stock form by mixing the polymer material, a cross-linking agent, and a blowing agent to form a slab, heating the mixture in a mold so the cross-linking agent can cross-link the polymer material and the blowing agent can decompose, and expanding the foam by release of pressure in the mold. Optionally, the bun stock formed upon release of pressure may be re-heated to effect further expansion.

Cross-linked polymer sheet is made by irradiating a polymer sheet with a high energy beam or by heating a polymer sheet containing a chemical cross-linking agent. The cross-linked polymer sheet is cut into the desired shapes and impregnated with nitrogen under high pressure and at a temperature above the softening point of the polymer. Releasing the pressure effects nucleation of bubbles and some expansion in the sheet. The sheet is reheated in a low pressure vessel under pressure above the softening point, and the pressure is released so that the foam can expand.

The density of the polymer foam provided in step (A) is preferably less than 100, more preferably not greater than 60, more preferably not greater than 40, and even more preferably less than 25, $kg/m^3$ and may have densities of at least 5, and suitably 10, $kg/m^3$. Preferably, the average cell size of the polymer foam provided in step (A) is at least 2 mm, more preferably at least 3 mm and in one embodiment preferably less than 4 mm, such as up to 3.9 mm. In addition, the foams prepared by the above-methods may be open or closed celled.

3. Adding Perforation Channels

The foam of this invention preferably has perforation channels, more preferably a multiplicity of perforation channels extending from the at least one surface into the foam such that there is an average of at least one, preferably at least 5, more preferably at least 10, even more preferably at least 20, and even more preferably at least 30, perforation channel(s) per 10 square centimeters ($cm^2$) area of the at least one surface. The term “multiplicity” as used herein means at least two. In a preferred embodiment, the foam of this invention contains at least seven perforation channels.

The perforation channels preferably have an average diameter at the at least one surface of at least 0.1 mm, more preferably at least 0.5 mm, and even more preferably at least 1 mm and preferably up to about the average cell size of the foam measured according to ASTM D 3756. One or more surfaces of the foam preferably has an average of at least four perforation channels per square centimeter extending from the at least one surface into the foam.

Typically, perforation comprises puncturing the base foam with one or more pointed, sharp objects. Suitable pointed, sharp objects include needles, spikes, pins, or nails. In addition, perforation may comprise drilling, laser cutting, high pressure fluid cutting, air guns, or projectiles. A description of how to create suitable perforation channels for a different purpose, namely to accelerate release of blowing agent from the foam, is provided in U.S. Pat. No. 5,585,058, which is incorporated herein by reference.

In addition, the base foam may be prepared to have elongated cells by pulling the foam during expansion. Such pulling results in elongated cells without changing or often, increasing the cell size in the horizontal direction. Thus, pulling results in an increased average cell size in the direction perpendicular to the vertical direction (EH average) and facilitates perforation.

Perforation of the base foam may be performed in any pattern, including square patterns and triangular patterns. Although the choice of a particular diameter of the sharp, pointed object with which to perforate the base foam is dependent upon many factors, including average cell size, intended spacing of perforations, pointed, sharp objects useful in the preparation of certain foams of the present invention will typically have diameters of from 1 mm to 4 mm. Step (B) is preferably carried out in at least seven distinct locations at a surface of the polymer foam which are separated from each other by an average distance not less than about twice the average diameter of the perforation channels formed by step (B). The perforation channels preferably have an average diameter in the range from 0.5 to 3 mm.

The polymer foam of step (A) preferably has an average thickness perpendicular to the surface perforated by step (B) of at least about 25 mm and the polymer foam of step (A) is preferably perforated according to step (B) to an average depth of at least 5 mm below the surface of the polymer foam.

Compression may be used as an additional means of opening cells. Compression may be performed by any means sufficient to exert external force to one or more surfaces of the foam, and thus cause the cells within the foam to burst. Compression during or after perforation is especially effective in rupturing the cell walls adjacent to the channels created by perforation since a high pressure difference across the cell walls can be created. In addition, unlike needle punching, compression can result in rupturing cell walls facing in all directions, thereby creating tortuous paths desired for sound absorption.

The mechanical opening of closed-cells of the base foam lowers the airflow resistivity of the base foam by creating large-size pores in the cell walls and struts. In any event, regardless of the particular means by which it does so, such mechanical opening of closed-cells within the base thermoplastic polymer foam serves to enhance the sound absorption and sound insulation.

Of course, the percentage of cells opened mechanically will depend on a number of factors, including cell size, cell shape, means for opening, and the extent of the application of the means for opening applied to the base foam. The open cell content of the polymer foam according to ASTM D2856, Procedure A, after step (B) is nevertheless preferably not greater than about 50 percent. In one embodiment, the open cell content of the polymer foam according to ASTM D2856, Procedure C, after step (B) is not greater than about 50 percent.

The method is preferably carried out according to one or both of the formulae:

$$PD \geqq X/(ACS)^2$$

$$Z \times \%OCC/(100-\%OCC)) \leqq (PD)$$

wherein "PD" represents the number of perforation channels per square centimeter formed by step (B); "ACS" represents the average cell size of the polymer foam provided in step (A) measured in millimeters according to ASTM D3576; "%OCC" represents the percent open cell content of the perforated polymer foam formed by step (B) measured according to ASTM D2856, Procedure A; "X" is a positive integer preferably equal to 4, more preferably equal to 6 and even more preferably equal to 7; and "Z" is a positive number preferably equal to 1, more preferably equal to 1.5, and even more preferably equal to 2.

4. Performance and Utility

The foam of the present invention has excellent acoustic absorption capabilities. One way to measure the ability to absorb sound is to measure the acoustic absorption coefficient of the foam according to ASTM E-1050 at 25, 500, 1000 and 2000 Hz and then calculate the arithmetic average of those sound absorption coefficients. When that determination is made with the foams of the present invention, the average sound absorption coefficient is preferably at least about 0.2, more preferably at least about 0.3, even more preferably at least about 0.4, and even more preferably at least about 0.5.

The foam of this invention is useful for absorbing sound in the range from 20 to 20,000 Hz, preferably 50 to 5,000 Hz and even more preferably 250 to 2000 Hz, preferably such that the sound absorption capability is equivalent to the foregoing preferred average sound absorption coefficients. For example, the foam may be located in the presence of a sound intensity of at least 50 decibels, such as on a vehicle equipped with a combustion engine.

Another advantage of the foam of the present invention is that the high average sound absorption coefficient is achieved with a low water absorption. That is desirable to help limit corrosion of proximate metal parts, to avoid the growth of bacteria and mold, and to improve thermal insulation value where that is needed. The inventive foam preferably does not absorb more than 10, 5, 3, more preferably not more than 1.5, and even more preferably not more than 1, percent water by volume when measured according to European Norm (EN) 12088 at a 50° C. temperature gradient between a warm, water-saturated atmosphere and the foam (the latter of which is maintained at a temperature at or below 0° C. in order to condense the water onto the surface of the foam sample) based on a test period of 14 days exposure.

The polymer foam made by step (B) preferably has a thermal conductivity not greater than about 90, more preferably not greater than about 70, and even more preferably not greater than about 60, mW/m° K measured at an average temperature of 10° C. according to DIM52616. Preferably, the polymer foam made by step (B) has a water absorption of not greater than one of the aforementioned preferred percent by volume ranges and the thermal conductivity measured after exposing the perforated surface of the polymer foam made by step (B) to water at 20° C. and then removing surface moisture from the polymer foam is still within the foregoing preferred thermal conductivity ranges.

The foregoing properties make this invention useful as acoustic insulation, particularly in a vehicle exposed to an outdoor environment or in a wet environment, such as in a marine environment.

The following examples illustrate, but do not in any way limit the scope of the present invention. All parts and percentages are by weight and all temperatures are in ° C. unless otherwise stated.

EXAMPLE

This example illustrates foams to be used in this invention and the method of preparing the foams by the extrusion process. In Table 1, the foams used in this example are listed. The apparatus is a screw-type extruder having two additional zones for mixing and cooling at the end of usual sequential zones for feeding, melting and metering. An opening for blowing agent injection is provided on the extruder barrel between the metering and mixing zones. At the end of cooling zone, there is attached a die orifice having an opening of generally rectangular shape.

A low density polyethylene (LDPE) resin having a melt index of 0.9 g/10 min (ASTM D-1238 190° C./2.16 kg) and a density of 0.923 g/cm$^3$ and an ethylene-styrene interpolymer (ESI) resin is fed into the extruder at a ratio of 99/1 at a uniform rate. In addition, a flame retardant concentrate, a black colorant concentrate, glycerol monostearate (GMS) and an antioxidant are fed in at predetermined rates to achieve the desired levels of the effective ingredients. The ESI resin is INDEX® DS 201 (available from The Dow Chemical Company). The resin is an approximately 70:30 by weight copolymer of ethylene and styrene and has a melt index of 1.1 (ASTM D-1238 190° C./2.16 kg). The flame retardant concentrate consists of 37.5% each of a chlorinated paraffin wax (Clorez™ 760 available form Dover Chemical Corp.) and antimony trioxide and 25% of a low density polyethylene (1.8 melt index and 0.923 g/cm$^3$ density). The fire retardant concentrate is fed into the extruder at a rate so that the effective levels of the flame retardant compounds is 22.5 parts per one hundred parts of the resins (pph). The carbon black concentrate is Plasblak® PE3037 available from Cabot Plastics International which is 25% carbon black compounded in a LDPE base resin having a melt flow rate of 2 g/10 min.(measured according to ASTM D-1238 condition 230° C./2.16 kg). The effective carbon black level is 0.375 pph. GMS (Atmer™ 129 available from ICI Americas) is melt injected into the mixing zone at a rate of 1.5 pph. The antioxidant (Irganox™ 1010 available from Ciba Geigy Corp.) is fed in at a rate to be approximately 0.3 pph. The total feed rate of all solids was approximately 1723 kg/h.

The temperatures maintained at the extruder zones are approximately 160° C. at feeding zone, 200° C. at melting zone, 230° C. at metering zone and 190° C. at the mixing zone. Isobutane is injected into the mixing zone at a uniform rate of 7.2 pph. The temperatures of the cooling zone and the die block are gradually lowered to produce a good quality foam. At the cooling zone temperature of 112° C. and the die temperature of 112° C., a substantially closed-cell foam having a density of about 43 kg/m$^3$ and an average cell size of approximately 1.7 mm is obtained. The foam has a thickness of approximately 43 mm and a width of 750 mm (see Table 1).

The dimensions, density, and cell size of the foams is determined and the results are set forth in Table 1.

TABLE 1

| Test No. | Base Polymer (1) | Flame Retardant (pph) (2) | Foam Thick. (mm) (3) | Foam Width (mm) (4) | Foam Density (kg/m$^3$) (5) | Cell Size (mm) (6) |
|---|---|---|---|---|---|---|
| 1 | LDPE | 0 | 56 | 1280 | 275 | 2.6 |
| 2 | LDPE | 0 | 56 | 1280 | 29.6 | 2.5 |
| 3 | LDPE | 0 | 55 | 640 | 35.4 | 1.7 |
| 4 | LDPE/ESI: 99/1 | 4.5 | 43 | 750 | 43.1 | 1.7 |
| *5 | LDPE/ESI: 97/3 | 0 | 55 | 640 | 30.1 | 1.1 |
| *6 | LDPE | 0 | 60 | 620 | 37.0 | 4.8 |

Notes
*Not an example of this invention.
(1) LDPE = a low density polyethylene having density = 0.923 g/cm$^3$ and melt index = 0.9 g/10 min.; ESI = ethylene-styrene interpolymer resin INDEX ® DS 201 available from The Dow Chemical Company.
(2) 50/50 by weight mixture of chlorowax and antimony trioxide.
(3) Thickness of foam body in millimeters.
(4) Width of foam body in millimeters.
(5) Density of fully aged foam body in kilograms per cubic meter measured according to ASTM D 3575 Suffix W Method B.
(6) Average cell size determined per ASTM D 3756 in millimeters based on average of cell size measured in all three directions (extrusion, horizontal and vertical).

The foam plank is perforated with a 2 mm diameter needle in an approximately 10 mm×10 mm square pattern in order to accelerate blowing agent release from the foam. The other foam materials listed in Table 1 are made by a similar process with a slight variation in the resin type, additive types and levels and the blowing agent level. All the foams were perforated in a 10 mm×10 mm pattern corresponding to a perforation density of approximately one perforation per square centimeter. The open cell contents of those foams is determined by ASTM D 2856 and shown in Table 2.

The above foams perforated in a 10 mm×10 mm pattern are further perforated with a 2 mm diameter needle between the perforations of the 10 mm×10 mm pattern create a foam having perforations in a 5 mm×5 mm square hole pattern. The resulting perforation density is approximately 4 perforations per square centimeter.

Test specimens are prepared by boring out 29 mm-diameter cylinders through the thickness of the foams and then slicing off one end of the cylinders to specimens of approximately 55 mm in thickness for determining the percent open cell content according to ASTM D 2856 Procedures C and A, For the foams thinner than 55 mm thickness, only the skin on one end was removed. Thus, the test specimens are cylinders having skins removed from the side and one end and with the skin on the other end. For the macrocellular foam (Test No. 1.6), the cylindrical test specimens of about 45 mm in diameter and 35 mm in length with skins removed from the side and both ends were employed. The increase in percent open cell content introduced by the additional perforation of the foam bodies having the 10 mm×10 mm pattern perforations is calculated for each foam body.

The results of the above percent open cell determinations are shown in Table 2 below.

TABLE 2

| Test No. | Open Cell 10 × 10 mm Perforation Pattern C % (7) | A % (7) | Open cell 5 × 5 mm Perforation Pattern C % (7) | A % (7) | Open Cell Increased A % (8) |
|---|---|---|---|---|---|
| 1 | 41 | 17 | 63 | 39 | 22 |
| 2 | 37 | 14 | 55 | 31 | 17 |
| 3 | 29 | 12 | 44 | 28 | 16 |
| 4 | 27 | 11 | 44 | 27 | 17 |
| *5 | 23 | 13 | 32 | 21 | 8 |
| *6 | 77 | 32 | 95 | 49 | 17 |

Notes
*Not an example of this invention.
(7) Open cell content of foam body determined per ASTM D 2856 in millimeters. C = calculated per Procedure C; A = calculated per Procedure A. Specimens of 29 mm diameter and 55 mn in length were used if the thickness of the foam is thicker than 55 mm. For thinner foams, the specimen thickness was approximately the thickness of the test specimen except for the skin from one side was removed.
(8) Increased open cell content by additional perforation in percentage.

As shown in Table 2, the foams with the 10 mm×10 mm perforation pattern have an open cell content (per Procedure A) of less than 20% even though those foams have been perforated in an approximately one perforation per square centimeter density. The additional perforation of Comparative Test Foam 5 increased the open cell content of that foam by only 8 percent due to the smaller average cell size.

The sound absorption coefficients of the foams are measured per ASTM E1050 using an impedance tube. The apparatus consists of a Model 4206 acoustical impedance tube and Model 3555 signal analyzer both supplied by Brueel and Kjaer A/S, Naerumn, Denmark. This apparatus measures the normal incidence sound absorption coefficient.

The same specimens as used for open-cell measurement are used after the cylinders are shortened to 35 mm in thickness by cutting off the end having no skin. For Comparative Test No. 6 foam 29 mm cylinders are bored out of the 45 mm diameter specimens. Thus, the foam specimens of Comparative Test No. 6 have no skins, while the other foam specimens have skins on one end. First, sound absorption is measured with the specimen loaded to have the skin side directed toward the incident wave and then, the specimen is tested again after being flipped over, now with the cut skin facing to the incident wave. The sound absorption data are presented in Table 3

TABLE 3

| Test | % OCC (1) | Δ % OCC (2) | ASC (3) | TC (4) |
|---|---|---|---|---|
| 1.1 | 39 | 22 | 0.42 | 70.0 |
| 1.2* | 17 | — | 0.28 | — |
| 2.1 | 31 | 17 | 0.38 | 65.2 |
| 2.2* | 14 | — | 0.26 | — |
| 3.1 | 28 | 16 | 0.32 | 59.4 |
| 3.2* | 12 | — | 0.18 | — |
| 4.1 | 27 | 17 | 0.34 | — |
| 4.2* | 11 | — | 0.17 | — |
| 5.1* | 21 | 8 | 0.25 | 50.4 |
| 5.2* | 13 | — | 0.12 | — |
| 6.1* | 49 | 17 | 0.41 | 103.0 |
| 6.2* | 32 | — | 0.45 | — |

The test numbers with an asterisk are comparative examples.
(1) "% OCC" represents the open cell content of the foam body perforated in a 5 mm × 5 mm pattern determined according to ASTM D 2856, Procedure A.
(2) "Δ % OCC" represents the change in open cell content of the foam body perforated in a 5 mm × 5 mm pattern determined according to ASTM D 2856, Procedure A., relative to the open cell content of the foam body perforated in a 10 mm × 10 mm pattern determined according to ASTM D 2856, Procedure A
(3) "ASC" represents the average sound absorption coefficient of the foam body which is the average of the sound absorption coefficients determined according to ASTM E1050 for 250, 500, 1000 and 2000 Hz sound frequencies.
(4) "TC" represents the thermal conductivity of the foam body in mW/m K determined according to DIN 52616 at an average temperature of 10° C.

The data show that except for the macrocellular foam (Comparative Test No. 6), foams with 1 perforation/cm$^2$ have ASC values lower than 0.3. Removal of the skin enhances the sound absorption capability of the foams only slightly but the ASC values do not exceed 0.3. Perforation significantly enhances sound absorption performance of the foams according to the present invention, but the ASC for the foam having 1.1 mm cell size (Comparative Test No. 5) is still less than 0.3.

As can also be seen in Table 3, the foams having an intermediate cell size between 1.7 mm and 2.6 mm have a thermal conductivity in the range from 50 mW/m° K to 60 mW/m° K, which is significantly lower than the thermal conductivity of the macrocellular foam of Comparative Test No. 6. Thus, the foams surprisingly solve the problem of achieving both good acoustic absorption and thermal insulation properties.

What is claimed is:

1. A method for making cellular acoustic absorption polymer foam having improved thermal insulating performance comprising:

(A) Providing a polymer foam having an average cell size in the range from 1.5 mm to 4 mm and an open cell content not greater than 40 percent measured according to ASTM D2856, Procedure A, and (B) Perforating the polymer foam provided in step (A) at a surface of the polymer foam to form a multiplicity of perforation channels extending from that surface into the polymer foam such that the open cell content of the foam measured according to ASTM D2856, Procedure A, is increased relative to the step (A) polymer foam by at least 10 percent to obtain a perforated polymer foam having an open cell content of at least 20 percent, measured according to ASTM D2856, Procedure A, wherein the perforating step (B) is carried out such that the number of perforation channels per square centimeter formed by step (B), "PD", has a value defined by equation (I):

$$PD \geqq X/(ACS)^2 \qquad (I)$$

wherein "ACS" represents the average cell size of the polymer foam provided in step (A) measured in millimeters according to ASTM D3576 and "X" equals 4, wherein PD is at least 30 perforation channels per 10 square centimeters and/or ACS is at least 3 mm.

2. The method of claim 1 wherein step (B) is carried out in at least seven distinct locations at a surface of the polymer foam which are separated from each other by an average distance not less than twice the average diameter of the perforation channels formed by step (B).

3. The method of claim 1, wherein step (B) forms perforation channels having an average diameter in the range from 0.1 to 3 mm.

4. The method of claim 1, wherein the polymer foam of step (A) has an average thickness perpendicular to the surface perforated by step (B) of at least 25 mm.

5. The method according to claim 4 wherein the polymer foam of step (A) is perforated according to step (B) to an average depth of at least 5 mm below the surface of the polymer foam.

6. The method according to any one of claim 1, wherein the open cell content of the polymer foam according to ASTM D2856, Procedure A, after step (B) is not greater than 50 percent.

7. The method according to any one of claim 1 carried out according to the equation (II):

$$Z \times \%OCC/(100-\%OCC)) \leqq (PD) \qquad (II)$$

wherein "PD" represents the number of perforation channels per square centimeter formed by step (B); "%OCC" represents the percent open cell content of the perforated polymer foam formed by step (B) measured according to ASTM D2856, Procedure A; and "Z" is a positive number equal to 1.

8. The method according to claim 1, wherein the open cell content of the polymer foam according to ASTM D2856, Procedure C, after step (B) is not greater than 50 percent.

9. The method according to claim 1, wherein the average cell size of the polymer foam provided in step (A) is in the range from 3.0 to 3.9 mm.

10. The method according to claim 1, wherein the density of the polymer foam provided in step (A) is less than 40 kg/m$^3$.

11. The method according to claim 1, wherein the polymer foam provided according to step (A) is a thermoplastic polymer foam comprising polypropylene resin.

12. The method according to claim 1, wherein the polymer foam provided according to step (A) is a cellular thermoplastic polymer foam, wherein the thermoplastic polymer comprises:

(A) at least one predominantly isotactic, polypropylene polymer having (1) a tan δ value not greater than 1.5, (2) a melt tension of at least 7 centiNewtons (cN), and/or (3) a melt strength of at least 10 centiNewtons (cN) and (B) at least one ethylene polymer resin produced via a free radical process blended with the polypropylene polymer in a weight ratio of not greater than 65:35.

13. A method for making cellular acoustic absorption polymer foam having improved thermal insulating performance comprising:

(A) Providing a polymer foam having an average cell size in the range from 1.5 mm to 4 mm and an open cell content not greater than 40 percent measured according to ASTM D2856, Procedure A, and (B) Perforating the polymer foam provided in step (A) at a surface of the polymer foam to form a multiplicity of perforation channels extending from that surface into the polymer foam such that the open cell content of the foam measured according to ASTM D2856, Procedure A, is increased relative to the step (A) polymer foam by at least 10 percent to obtain a perforated polymer foam having an open cell content of at least 20 percent, measured according to ASTM D2856, Procedure A, wherein the perforating step (B) is carried out such that the number of perforation channels per square centimeter formed by step (B), "PD", has a value defined by equation (I):

$$PD \geqq X/(ACS)^2 \quad \text{(I)}$$

wherein "ACS" represents the average cell size of the polymer foam provided in step (A) measured in millimeters according to ASTM D3576 and "X" equals 6, wherein PD is at least 30 perforation channels per 10 square centimeters and/or ACS is at least 3 mm.

14. A method for making cellular acoustic absorption polymer foam having improved thermal insulating performance comprising:

(A) Providing a polymer foam having an average cell size in the range from 1.5 mm to 4 mm and an open cell content not greater than 40 percent measured according to ASTM D2856, Procedure A, and (B) Perforating the polymer foam provided in step (A) at a surface of the polymer foam to form a multiplicity of perforation channels extending from that surface into the polymer foam such that the open cell content of the foam measured according to ASTM D2856, Procedure A, is increased relative to the step (A) polymer foam by at least 10 percent to obtain a perforated polymer foam having an open cell content of at least 20 percent, measured according to ASTM D2856, Procedure A, wherein the perforating step (B) is carried out such that the number of perforation channels per square centimeter formed by step (B), "PD", has a value defined by equation (I):

$$PD \geqq X/(ACS)^2 \quad \text{(I)}$$

wherein "ACS" represents the average cell size of the polymer foam provided in step (A) measured in millimeters according to ASTM D3576 and "X" equals 7, wherein PD is at least 30 perforation channels per 10 square centimeters and/or ACS is at least 3 mm.

15. The method according to claim 12, wherein "ACS" of equation (I) is at least 3 mm.

16. The method according to claim 1, wherein the cellular acoustic absorption polymer obtained by the method has a thermal conductivity not greater than 70 mW/m° K measured at an average temperature of 10° C. according to DIM52616 after exposing the perforated surface of the polymer foam made by step (B) to water at 20° C. and then removing surface moisture from the polymer foam.

17. A cellular polymer foam obtainable according to the method of claim 1, the foam comprising perforation channels extending from a surface of the foam into the foam such that the number of perforation channels per square centimeter, "PD", has a value defined by the equations (I):

$$PD \geqq x/(ACS)^2 \quad \text{(I)}$$

wherein "ACS" represents the average cell size of the polymer foam measured in millimeters according to ASTM D3576 and "X" equals four, wherein PD is at least 30 perforations per 10 square centimeters and/or ACS is al least 3 mm; and wherein the cellular polymer foam has an open cell content of at least 20 percent (ASTM D2856, procedure A) and an average cell size in a range from 1.5 mm to 4 mm; and wherein the cellular polymer foam is made from a thermoplastic polymer comprising: (A) at least one predominantly isotactic propylene polymer having a tan δ value not greater than 1.5 and optionally (B) at least one ethylene polymer produced via a free radical process blended with (A), the weight ratio of (B) to (A) being not greater than 65:35.

18. The cellular polymer foam of claim 17 wherein component (B) is low density polypropylene.

* * * * *